United States Patent Office 3,547,497
Patented Dec. 15, 1970

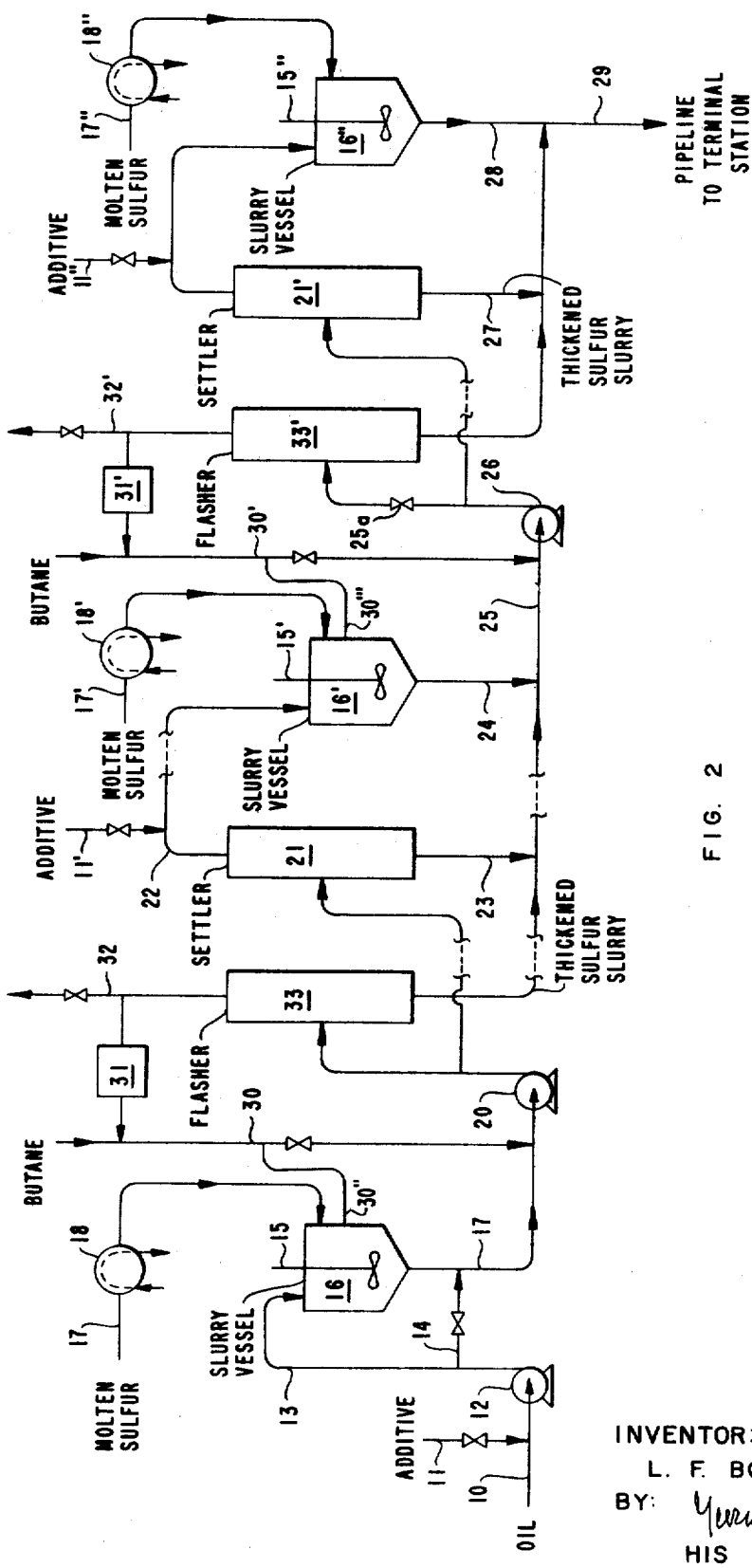

3,547,497
OPERATING TECHNIQUE FOR SULFUR SLURRY PIPELINE
Leonard F. Bolger, Clarkson, Ontario, Canada, assignor to Shell Oil Company, New York, N.Y., a corporation of Delaware
Filed Apr. 7, 1969, Ser. No. 813,994
Int. Cl. B65g 53/04
U.S. Cl. 302—66  11 Claims

ABSTRACT OF THE DISCLOSURE

An improved method of making concentrated sulfur-oil slurry for pipeline transportation comprising increasing the sulfur content in the process of making a slurry by increment addition of fresh molten sulfur into a preformed slurry of low sulfur concentration until a concentrated sulfur-oil slurry is obtained.

The present invention relates to a novel and new method of preparing a sulfur-oil slurry for pipeline transportation in which the sulfur content comprises of from about 30% to about 60% volume of the total slurry by adding or injecting in increments molten slurry into preformed low concentration sulfur-oil slurry the sulfur content of which is below 20% and generally is below 10% by volume.

BACKGROUND OF THE INVENTION

The transportation of sulfur neat or as a water or oil slurry in pipelines is well known in the art as noted by reference to U.S. Pats. 2,798,772; 2,917,345 or 2,947,578 or as described in Pipeline Industry, June 1967, pages 58–60. In making a sulfur-hydrocarbon slurry, the molten sulfur is generally injected or sprayed into a liquid carrier such as a liquid hydrocarbon to form a slurry suitable for transportation through a pipeline. Formation of a stable slurry wherein the sulfur does not undergo any undesirable change or the slurry does not exhibit a tendency to wide variation in viscosity is essential to the process in addition to other problems which may be encountered during and after transportation of the slurry through a pipeline. Thus, agglomeration and separation of the sulfur from the carrier fluid, plating, depositing or coating of the sulfur on pipeline walls causing plugging of the pipeline, corrosion, viscosity changes due to pressure and temperature variations requiring greater pumping power which increases operation costs, etc., are only a few of the problems normally encountered in making sulfur-liquid hydrocarbon slurries for transportation through pipelines.

Although the above are serious problems for consideration in transporting sulfur through pipelines, nevertheless the transportation of sulfur in slurry form through pipelines can be made to be an effective, attractive and economic means of sulfur transportation, particularly since sulfur is recovered or obtained from isolated, remote and inaccessible areas, and must be transported to desired accessible areas. As noted above, a number of methods have been proposed for making sulfur slurries for pipeline transportation such as by injecting molten sulfur into water or a liquid hydrocarbon thereby forming a sulfur slurry and thereafter injecting the slurry into a pipeline for transportation to a terminal station. Known methods for making sulfur slurries suitable for transporting through pipelines generally do not overcome the agglomeration, deposition, sticking, coating and/or plugging problems described above. Also, it has been found to be desirable that in order to avoid the sticking of sulfur to pipeline walls and plugging of the pipeline, that the slurry when injected into the pipeline be at a temperature of below 150° F. and preferably around 120° F. or lower. Since the molten sulfur is generally at between about 240° F. and about 300° F. or higher when injected into a hydrocarbon carrier, the slurry formed is substantially above the temperature desired for injection into the main pipeline and, therefore, should be cooled, preferably to at least 120° F. Therefore, slurrying sulfur in oil and cooling it effectively for pipeline injection and transportation has been found to be one of a number of essential features in the technology of sulfur-oil slurry making. Conventional cooling such as allowing the slurry to cool on standing is time consuming and costly and other means such as surface heat exchange is also costly and prone to cause fouling and plugging. Also it has been discovered that the amount of sulfur that can be added or injected into a liquid carrier without producing adverse effects on the slurry such as undesired sulfur particle size and shape, which if not controlled, results in sulfur sticking, agglomeration, separation and the like. Thus, attempts to form good sulfur-oil slurries by adding, injecting or spraying molten sulfur into a liquid hydrocarbon carrier in concentration of above about 20% sulfur results in slurries in which the sulfur particle size and shape obtain undesirable configuration for pipeline transportation and to agglomerate, separate and settle out of solution, namely the liquid carrier.

An object of the present invention is to prepare sulfur-liquid hydrocarbon slurries by increment sulfur spraying into the hydrocarbon so as to make a suitable slurry for pipeline transportation.

Still another object of the present invention is to prepare by increment addition of molten sulfur to a sulfur-liquid hydrocarbon slurry which final slurry is resistant to agglomeration, deposition, sticking and plugging of equipment used in its manufacture and pipelines transporting said slurries to a terminal station.

Still another object of this invention is to prepare by increment spraying of molten sulfur into a preformed low concentration a sulfur-oil slurry in which the sulfur particles are essentially in spherical form and whose particle size varies from less than 1 micron to over 350 microns and preferably as a mixture of 10–45% of sulfur particles of 10–44 microns or preferably less than 40 microns and the remainder (90–55%) being between 45 and 250 microns; said sulfur particles being resistant to attrition, separation and deposition and sticking to metal surfaces.

Still another object of the present invention is to prepare by increment addition of molten sulfur to oil so as to form a final 40–60% sulfur-oil slurry for pipeline transportation which can be pumped at reduced pumping costs and required a minimum of handling and is readily separated from the oil phase at the terminal end of the line.

SUMMARY OF THE INVENTION

It has now been discovered that stable sulfur-oil slurries of high sulfur content, namely from about 30% to about 60% sulfur dispersed in 70–40% liquid hydrocarbon ranging in viscosity from liquid petroleum gas crude oil and fractions thereof and their mixtures in which the sulfur is preferably present as spherical particles ranging in size of from about 10 to about 350 microns and preferably comprising mixtures of spherical sulfur particles of which 10–40% have dimensions of less than 40 microns and the balance being in the 45–250 micron range, by initially spraying in a liquid hydrocarbon carrier from about 5% to about 20%, preferably between 10% and 15% molten sulfur at 240–300° F., concentrating the slurry thus formed by suitable means such as in thickeners or settlers thereby concentrating the slurry and removing part or all of the essentially clear liquid and thereafter using the clear liquid per se or admixing it with a fresh liquid hydrocarbon to form additional sulfur slurry under above conditions and combining it with the initial preformed slurry and repeating the cycle until the required sulfur concentration of from about 30% to about 60% sulfur by volume in the liquid carrier, such as a crude oil, is achieved. The incremental addition of molten sulfur in the preparation of sulfur-oil slurries results in a final slurry having flow characteristics of a Newtonian fluid and a high sulfur content (30–60% v.), the shape and size of the sulfur particles being carefully controlled so as to produce best results for pipeline transportation, and the final slurry temperature is under better control for injection into the main pipeline for transportation to a terminal station. Also, the incremental preparation of slurries and their mixtures results in a final slurry which at the terminal end of the line is efficiently separated into its components, namely sulfur and the liquid carrier such as oil. Additionally, the preparation of sulfur slurries by the process of this invention results in a sulfur predominantly in the non-mu ($\mu$) sulfur form or essentially the sulfur particles formed by the process of this invention is soluble sulfur, namely soluble in $CS_2$.

The process of this invention takes advantage of possible distribution availability of the sulfur and the liquid carrier along the sites of the pipeline transporting the slurry; also it involves a method of distributing required slurry vehicle to a number of separated slurry preparation sites and effects desired cooling of the final concentrated slurry as it is transported through the main pipeline.

The carrier vehicle can be brought to the first slurry preparation site by pipeline or other means. The slurry can be prepared in part of the vehicle stream and remixed with the remaining stream, or it is prepared in the total stream. The total sulfur used at the first point results in a slurry having a relatively low sulfur concentration.

The low concentration slurry is transported by pipeline to the next slurry preparation site. Here the slurry is passed through a thickener or other device that allows clean liquid to be drawn off for use in the second preparation plant. This process also thickens the incoming slurry to a slightly higher concentration which is by-passed around the second plant.

A slurry can be prepared in a clean hydrocarbon liquid which is then mixed with the by-passed slurry to form the total outgoing stream. The result is to add the required sulfur output at the second slurry preparation plant so that the outgoing slurry is at a higher sulfur concentration than the incoming stream.

The process is repeated as often as necessary to get required liquid to all sites and required sulfur away from all sites. Thus, the one pipeline serves the dual purpose of carrying vehicle to the slurry preparation sites and also carrying slurry away from those sites. The design would be based on having, at the starting end of the system, all the liquid vehicle required to give the correct slurry concentration leaving the last slurry preparation site.

The liquid hydrocarbon vehicle for preparing the sulfur slurries by the process of this invention can range in viscosity from a light petroleum fraction such as liquefied petroleum gas (LPG), gasoline, kerosene, fuel oil, lube oil, petroleum distillates, condensates, crude oil and mixtures thereof, and should be dehydrated and desalted. Preferred carriers are liquid petroleum containing at least 10% or higher of aromatics, preferably about 15–80% aromatic enriched kerosene or oil condensate fractions or crude oil containing 15–30% aromatics which include mono- and polyaromatic hydrocarbons. The vehicles preferably should contain some asphaltenes which can be naturally present or added to the vehicle. The asphaltenic material can be added in amount of from 0.001% to 10% to the slurry of sulfur and liquid petroleum prior to or during the making of the slurry or the asphaltenic material can be injected when necessary in various places along the pipeline where indications are that the slurry might cause sulfur agglomeration, deposition, sticking or plugging of the line.

The asphaltenic additive can be obtained from unrefined or refined crude oil and fractions thereof. By unrefined crude oil is meant any crude oil which has not been processed in a refinery. Thus, a crude oil may be used at it is removed from the ground, or it may be first processed in field units such as oil-water separators, degasers, etc. Although just how the asphaltenes function in the slurry mixture is not understood, it has been found that the asphaltenes prevent sulfur agglomeration, sticking and aid in the formation of spherical sulfur particles having dimensions of from 1 to 800 microns and preferably between 20 and 400 microns.

The asphaltenes can be recovered from petroleum stocks by any suitable means such as described in the Journal of the Institute of Petroleum, February 1968, pages 50–53 and April, 1968, pages 107–114 or as described in U.S. Pats. 3,206,388; 3,228,870; 3,153,623; 2,729,589; 3,368,876; 3,364,138; 3,206,388 and 3,275,076. The latter two patents base materials can be used per se as the asphaltene additive and carrier for the slurry. In other words, high asphaltenic crude or fractions thereof containing at least 1% asphaltenes can be used both as the carrier and additive for the sulfur slurry. The asphaltenes, asphaltogenic acids and carboids and their method of recovery and separation from crudes and fractions thereof is also fully described in chapter 9 of the Sachanen's book on "The Chemical Constituents of Petroleum" and includes petroleum resins, asphaltenes, asphaltogenic acids and their derivatives. Also, the asphaltenic materials described in U.S. Pats. 3,275,076; 3,284,340 or 3,336,146 can be used and they can be separated from petroleum by methods described in U.S. Pats. 3,364,138 and 3,368,876.

In addition to asphaltenes, corrosion inhibitors and surfactants can be incorporated into each slurry preparation site or at the final slurry site during or after its preparation.

Incremental slurry preparation having high sulfur concentration (30–60% v.) also results in a slurry having Newtonian flow characteristics which obviate the troublesome problems normally resulting with solids slurries transported through pipelines and generally having Bingham plastic or pseudo-plastic flow characteristics. The latter two flow characteristics result in separation, settling and other undesirable problems which are now avoided due to the Newtonian flow characteristics of slurries prepared by the incremental process of this invention.

BRIEF DESCRIPTION OF THE DRAWINGS

The drawings illustrate the process of this invention.

Figure 1:
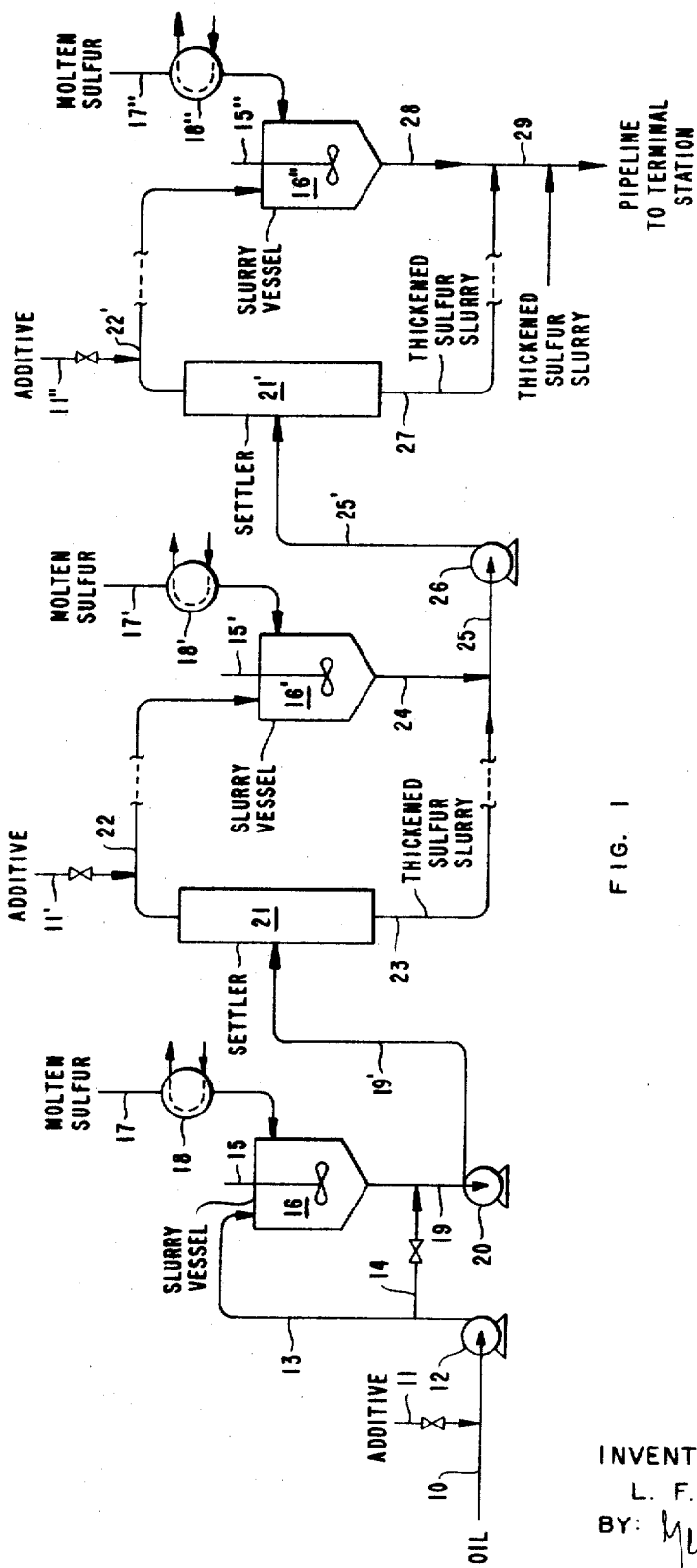
In FIG. 1, into spray or slurry vessel 16 is introduced oil via line 10 into which line can be also introduced additives e.g., asphaltenes via line 13 and the oil or oil-additive mixture is passed through pump 12 into line 13 and a portion, if desired, introduced into sulfur-oil slurry line 19 via valved line 14. The oil introduced into slurry tank 16 can be hot or cold, preferably the latter. Molten sulfur is sprayed into the oil containing slurry tank 16 via line 17 having a heat exchanger 18 in the line in order to maintain the sulfur in a molten state and the sulfur can be sprayed above or below the oil level of the oil in the slurry vessel 16 which may have a stirring device 15.

The amount of slurry sprayed into the oil in slurry vessel 16 is generally about 10% so that the prepared sulfur-oil slurry leaving the slurry vessel 16 via line 19 is around 10% sulfur-oil slurry which is pumped through pump 20 and line 19' into settler or thickener 21. The section of the line 19' can be of substantial length, namely 10–100 or more miles or it can be relatively short 500 or less feet. The slurry in settler or thickener 21 is allowed to settle so as to form an essential sulfur-free oil layer and a thickened sulfur slurry. The sulfur-free oil is removed from the settler 21 via line 22 and additive added if necessary via line 11' as well as fresh oil or mixtures of the two and the oil or compounded oil is introduced into slurry vessel 16' having a stirring device 15 into which fresh molten sulfur is sprayed via line 17 and heat exchanger 18' to form another batch of about 10% to 20% sulfur-oil slurry which is removed from the vessel 16' via line 24 and is intermixed with the thickened or concentrated sulfur slurry coming from line 23 the two slurries entering line 25 and conveyed through pump 26, line 25' and into settler 21'. The concentration of the sulfur slurry entering settler 21' is about 15–20% sulfur. In settler 21' the oil is removed via line 22' and the thickened or concentrated slurry removed via line 27. The oil introduced into slurry vessel 16" via line 22" into which additives and/or fresh oil can be introduced is used to make another batch of sulfur slurry as in vessels 16 and 16' by injecting or spraying molten sulfur via line 17" and heat exchanger 18". The sulfur slurry from vessel 16" is removed via line 28 and admixed with thickened or concentrated sulfur slurry coming from settler 21' via line 27 in line 29 which now has a sulfur concentration of 30–40% and the sulfur slurry is transported via line 29 to a terminal station.

FIG. 2 illustrates a system of increment addition of molten sulfur to make slurries in which use of evaporative cooling of each slurry batch is made use of prior to introducing said slurry to the settlers or thickeners (21, 21') by the means as described in copending application Ser. No. 784,727 filed Dec. 18, 1968. Also evaporative cooling in the slurry preparation vessels 16, 16' and 16" can be utilized as described in copending application Ser. No. 784,616 filed Dec. 18, 1968 when evaporative cooling is employed and as illustraed by FIG. 2 the evaporative fluid such as butane can be injected directly into vessels 16 via line 30 and 30" and removed in flasher 33 where it is removed via line 32 or returned to line 30 and/or 30' via compressor 31. The process is repeated in flasher 33' and compressor 31'. All other numerals in FIG. 2 correspond to the numerals in FIG. 1.

PREFERRED EMBODIMENT OF THE INVENTION

A sulfur-oil slurry for pipeline transportation using FIG. 1 was prepared by spraying molten sulfur (240° F.–315° F.) via line 17 into a vessel 16 containing enough crude oil having from 0.1–2% asphaltenes introduced into the vessel 16 via lines 10 and 13. The amounts of sulfur and oil used were controlled to form a sulfur slurry having a sulfur content of 10–15%. The sulfur slurry was pumped into the settler or thickener 21 where the oil was separated from the sulfur slurry thereby thickening or concentrating the slurry by 5–10%. The decanted oil from settler 21 and admixed with fresh oil if necessary was introduced into vessel 16' and a fresh 10–15% sulfur slurry was formed therein by injecting molten sulfur into the crude oil. The thickened or concentrated sulfur slurry from settler 21, was removed via line 23 and mixed with fresh slurry found in vessel 16' by withdrawing it via line 24 and the mixture of slurries was pumped via lines 25 and 25' through pump 26 into settler 21'. Separation of oil from the slurry was effected in settler 21' as in settler 21 and a thickened slurry (20–30% S) was removed via line 27. The decanted oil was introduced via line 22' and enriched with fresh oil and/or additives was introduced into vessel 16" into which molten sulfur was injected via line 17" and a sulfur slurry removed via line 28. The slurry from line 28 was mixed with the concentrated slurry from line 27 and the mixture entering line 29 was a concentrated 35–45% sulfur-crude oil slurry having Newtonian flow characteristics. The sulfur particles in the final slurry were spherical in shape and had a substantial amount 10–45% of particles, having dimension of less than 40 microns and essential none above 450 microns and generally the larger particles (90–55%) were between 45 and 300 microns.

Sulfur slurries prepared by the method of the present invention can be transported through pipelines over great distances without the danger of sulfur deposition, agglomeration, sticking or plugging of the pipelines.

At the terminal end of the line the sulfur can be removed from the liquid hydrocarbon by suitable means such as described in U.S. Pat. 2,809,885 or as described in the copending patent application Ser. No. 684,507, filed Nov. 20, 1967 which comprises treating oil contaminated sulfur with an aqueous solution containing a mixture of alkali hydrosulfide and corresponding hydroxide e.g., ammonium hydrosulfide and ammonium hydroxide or the oil contaminated sulfur can be treated by this means or the entire slurry can be thus treated or the slurry can be separated into its components by other suitable means such as sulfur can be recovered from the oil slurry by centrifuge or filtration or by chemical means e.g., liquid-liquid extraction with a hydrocarbon solvent containing 10–50% aromatic. Thus, at the receiving terminal the sulfur slurry can be filtered and washed. The recovering sulfur is then melted and purified by liquid-liquid extraction with an aromatic hydrocarbon such as cumene. Also, if desired, the filtered sulfur can be steam stripped to recover bright yellow sulfur.

The foregoing description of the invention is merely intended to be explanatory thereof. Various changes in the details of the described method may be made within the scope of the appended claims without departing from the spirit of the invention.

I claim as my invention:

1. A method of preparing a concentrated sulfur-liquid hydrocarbon slurry for pipeline transportation by incremental addition of sulfur to an oil carrier comprising the steps:
   (a) injecting from about 1 to about 20% molten sulfur into liquid hydrocarbon carrier to form a sulfur-liquid hydrocarbon slurry
   (b) concentrating the slurry (a) by settling and separating liquid hydrocarbon carrier from the concentrated slurry
   (c) using the separated liquid hydrocarbon from (b) as a base for making a new batch of sulfur slurry
   (d) admixed concentrated slurry of step (b) with dilute slurry of step (c) to form a sulfur slurry, having a sulfur concentrate higher than that of concentrated step (b)
   (e) repeating steps (a) through (d) until a final sulfur-liquid hydrocarbon slurry having a sulfur content of at least 30% is obtained.

2. The method of claim 1 wherein the carrier is a petroleum oil and in step (c) additional fresh oil is admixed with that recovered from step (b).

3. The method of claim 2 wherein the petroleum oil is a crude oil containing asphaltenic materials.

4. The method of claim 3 wherein asphaltenic materials are added to fresh crude oil used in step (c).

5. The method of claim 1 wherein a corrosion inhibitor is added to the final slurry.

6. The method of claim 1 wherein a corrosion inhibitor is added to the initial slurry of step (a).

7. The method of claim 1 wherein the final sulfur-oil slurry containing 35–60% sulfur is injected into a pipeline and transported to a terminal station.

8. The method of claim 3 wherein the final sulfur-oil slurry containing 35–60% sulfur is injected into a pipeline and transported to a terminal station.

9. The method of claim 5 wherein the final sulfur-oil slurry containing 35–60% sulfur is injected into a pipeline and transported to a terminal station.

10. The method of claim 6 wherein the final sulfur-oil slurry containing 35–60% sulfur is injected into a pipeline and transported to a terminal station.

11. The method of claim 7 wherein the sulfur-oil slurry is separated into its separate components of oil and sulfur at the terminal end of the pipeline.

References Cited

UNITED STATES PATENTS

| 2,798,772 | 7/1957 | Redcay | 302—14 |
| 3,443,837 | 5/1969 | Meyer et al. | 302—14 |
| 3,476,441 | 11/1969 | Elliott | 302—66 |

ANDRES H. NIELSEN, Primary Examiner

U.S. Cl. X.R.

302—14